United States Patent
Sakamoto

(10) Patent No.: US 11,451,006 B2
(45) Date of Patent: Sep. 20, 2022

(54) FIBER LASER DEVICE, PRODUCTION METHOD FOR FIBER LASER DEVICE, AND SETTING METHOD

(71) Applicant: FUJIKURA LTD., Tokyo (JP)

(72) Inventor: Shinichi Sakamoto, Chiba (JP)

(73) Assignee: Fujikura Ltd., Tokyo (JP)

( * ) Notice: Subject to any disclaimer, the term of this patent is extended or adjusted under 35 U.S.C. 154(b) by 121 days.

(21) Appl. No.: 17/043,167

(22) PCT Filed: Mar. 27, 2019

(86) PCT No.: PCT/JP2019/013356
§ 371 (c)(1),
(2) Date: Sep. 29, 2020

(87) PCT Pub. No.: WO2019/189459
PCT Pub. Date: Oct. 3, 2019

(65) Prior Publication Data
US 2021/0057873 A1    Feb. 25, 2021

(30) Foreign Application Priority Data

Mar. 30, 2018    (JP) .............. JP2018-069697

(51) Int. Cl.
*H01S 3/30*    (2006.01)
*H01S 3/067*    (2006.01)
(Continued)

(52) U.S. Cl.
CPC .......... *H01S 3/302* (2013.01); *H01S 3/0675* (2013.01); *H01S 3/2383* (2013.01);
(Continued)

(58) Field of Classification Search
CPC .... H01S 3/302; H01S 3/0675; H01S 2301/03; B23K 26/009
See application file for complete search history.

(56) References Cited

U.S. PATENT DOCUMENTS 5,838,700 A * 11/1998 Dianov ............... C03C 23/0025
                                                              359/334
6,778,320 B1 * 8/2004 Traynor ............. H04B 10/2914
                                                              359/344
(Continued)

FOREIGN PATENT DOCUMENTS

CN    101569066 A * 10/2009 ........... H01S 3/2333
CN    101689745 A * 3/2010 .............. H01S 3/302
(Continued)

OTHER PUBLICATIONS

English Translation of the International Preliminary Report on Patentability issued in corresponding International Patent Application No. PCT/JP2019/013356, dated Oct. 15, 2020 (8 pages).

(Continued)

*Primary Examiner* — Joshua King
(74) *Attorney, Agent, or Firm* — Osha Bergman Watanabe & Burton LLP

(57) ABSTRACT

A fiber laser device includes: an amplifying fiber; a delivery fiber in which laser light that has been outputted from the amplifying fiber is guided; and a Raman filter that reflects part of Raman scattered light that is generated by stimulated Raman scattering caused to the laser light.

6 Claims, 4 Drawing Sheets

(51) Int. Cl.
    *H01S 3/23*     (2006.01)
    *H01S 3/094*     (2006.01)
    *B23K 26/00*     (2014.01)

(52) U.S. Cl.
    CPC ....... *B23K 26/009* (2013.01); *H01S 3/094003* (2013.01); *H01S 3/094053* (2013.01); *H01S 2301/03* (2013.01)

(56) References Cited

U.S. PATENT DOCUMENTS

| | | | | |
|---|---|---|---|---|
| RE48,899 E | * | 1/2022 | Kliner | H01S 3/06754 |
| 2004/0095569 A1 | * | 5/2004 | Kan | H04B 10/07 |
| | | | | 356/73.1 |
| 2004/0174913 A1 | * | 9/2004 | Leplingard | H01S 3/302 |
| | | | | 372/3 |
| 2009/0046353 A1 | * | 2/2009 | Seo | H01S 3/302 |
| | | | | 359/334 |
| 2009/0097807 A1 | * | 4/2009 | Gu | G02B 6/14 |
| | | | | 385/123 |
| 2010/0098112 A1 | * | 4/2010 | Gapontsev | H01S 3/0675 |
| | | | | 372/6 |
| 2011/0038035 A1 | * | 2/2011 | Taylor | H01S 3/302 |
| | | | | 359/334 |
| 2011/0122902 A1 | * | 5/2011 | Shima | H01S 3/08027 |
| | | | | 372/27 |
| 2013/0020474 A1 | * | 1/2013 | Miyauchi | G02B 6/262 |
| | | | | 372/6 |
| 2013/0301663 A1 | * | 11/2013 | Clowes | H01S 3/08059 |
| | | | | 372/6 |
| 2014/0071518 A1 | * | 3/2014 | Inbar | H01S 3/0092 |
| | | | | 359/327 |
| 2014/0112357 A1 | * | 4/2014 | Abedin | H01S 3/0675 |
| | | | | 372/3 |
| 2014/0254614 A1 | * | 9/2014 | Nicholson | H01S 3/302 |
| | | | | 372/3 |
| 2015/0250542 A1 | * | 9/2015 | Islam | A61B 18/20 |
| | | | | 606/15 |
| 2016/0111851 A1 | * | 4/2016 | Kliner | G02B 6/02085 |
| | | | | 359/334 |
| 2017/0179678 A1 | * | 6/2017 | Kashiwagi | H01S 3/2391 |
| 2017/0209959 A1 | * | 7/2017 | Popp | B23K 26/0626 |
| 2017/0214212 A1 | * | 7/2017 | Kashiwagi | H01S 3/067 |
| 2017/0264068 A1 | * | 9/2017 | Marciante | H01S 3/06754 |
| 2021/0367391 A1 | * | 11/2021 | Bernier | H01S 3/094007 |

FOREIGN PATENT DOCUMENTS

| | | | | |
|---|---|---|---|---|
| CN | 103124044 A | * | 5/2013 | |
| CN | 104 112 970 A | | 10/2014 | |
| CN | 104112970 A | * | 10/2014 | |
| CN | 109193337 A | * | 1/2019 | H01S 3/0675 |
| JP | 2007123477 A | * | 5/2007 | |
| JP | 2015-95641 A | | 5/2015 | |
| WO | WO-02095885 A1 | * | 11/2002 | G02F 1/365 |
| WO | 2012/165389 A1 | | 12/2012 | |
| WO | WO-2012165389 A1 | * | 12/2012 | B23K 26/06 |
| WO | 2015/057482 A1 | | 4/2015 | |
| WO | WO-2015057482 A1 | * | 4/2015 | H01S 3/06745 |
| WO | WO-2016058624 A1 | * | 4/2016 | B23K 26/0626 |
| WO | 2017/129939 A2 | | 8/2017 | |
| WO | WO-2017129939 A2 | * | 8/2017 | B23K 26/0648 |
| WO | WO-2019077851 A1 | * | 4/2019 | |
| WO | WO-2020139704 A1 | * | 7/2020 | G02B 6/0208 |
| WO | WO-2020139706 A1 | * | 7/2020 | G02B 6/0208 |
| WO | WO-2020139708 A1 | * | 7/2020 | H01S 3/0675 |
| WO | WO-2020142506 A1 | * | 7/2020 | |

OTHER PUBLICATIONS

International Search Report issued in International Application No. PCT/JP2019/013356, dated Jun. 25, 2019 (1 page).

* cited by examiner

FIBER LASER DEVICE, PRODUCTION METHOD FOR FIBER LASER DEVICE, AND SETTING METHOD

TECHNICAL FIELD

The present invention relates to a fiber laser device. The present invention further relates to a production method of producing a fiber laser device. The present invention also relates to a setting method of, in a fiber laser device, setting a reflection attenuation by a processable workpiece.

BACKGROUND

In the field of material processing, fiber laser devices have drawn attention as laser beam machines which are excellent in ease of maintenance and processing ability. However, in a fiber laser device, in a case where a power density of laser light guided in an optical fiber becomes high, a nonlinear optical effect, such as stimulated Raman scattering, becomes likely to be brought about. Further, it is known that, in a case where power of Raman scattered light generated by stimulated Raman scattering becomes high, laser oscillation in a fiber laser device becomes unstable (see Patent Literature 1).

PATENT LITERATURE

Patent Literature 1
Japanese Patent Application Publication Tokukai No. 2015-95641

However, conventional fiber laser devices still have room for a further reduction in possibility that oscillation of laser light becomes unstable, by further suppression of an increase in power of Raman scattered light.

SUMMARY

In one or more embodiments of the present invention, (1) in a fiber laser device, suppress an increase in power of Raman scattered light and thereby reduce a possibility that oscillation of laser light becomes unstable, (2) produce a fiber laser device in which an increase in power of Raman scattered light is suppressed and thereby a possibility that oscillation of laser light becomes unstable is reduced, or (3) realize a fiber laser device in which an increase in power of Raman scattered light is suppressed and thereby a possibility that oscillation of laser light becomes unstable is reduced.

A fiber laser device in accordance with one or more embodiments of the present invention including: an amplifying fiber; a delivery fiber in which laser light that has been outputted from the amplifying fiber is guided; and a Raman filter which reflects part of Raman scattered light that is generated by stimulated Raman scattering caused to the laser light, the Raman filter being provided so that the following inequality (a) is satisfied:

$$10^{\frac{2\times g1\times L1-am}{10}} + 10^{\frac{2\times g1\times L1+2\times g2\times L2-2\times at-ar}{10}} < 10^{\frac{2\times g1\times L1+2\times g2\times L2-ar}{10}} \quad (a)$$

where: L1 represents a length of a light path from one of ends of the amplifying fiber which one is located on an opposite side to the delivery fiber to the Raman filter; g1 represents gain which the Raman scattered light receives per unit length in the light path; L2 represents a length of a light path from the Raman filter to one of ends of the delivery fiber which one is located on an opposite side to the amplifying fiber; g2 represents gain which the Raman scattered light receives per unit length in the light path; am represents a reflection attenuation by the Raman filter; at represents a transmission attenuation by the Raman filter; and ar represents a reflection attenuation by a workpiece which is processable by the fiber laser device.

In one or more embodiments of the present invention, a method of producing a fiber laser device includes: an amplifying fiber; a delivery fiber in which laser light that has been outputted from the amplifying fiber is guided; and a Raman filter which reflects part of Raman scattered light that is generated by stimulated Raman scattering caused to the laser light, the method including the step of providing the Raman filter so that the following inequality (a) is satisfied:

$$10^{\frac{2\times g1\times L1-am}{10}} + 10^{\frac{2\times g1\times L1+2\times g2\times L2-2\times at-ar}{10}} < 10^{\frac{2\times g1\times L1+2\times g2\times L2-ar}{10}} \quad (a)$$

where: L1 represents a length of a light path from one of ends of the amplifying fiber which one is located on an opposite side to the delivery fiber to the Raman filter; g1 represents gain which the Raman scattered light receives per unit length in the light path; L2 represents a length of a light path from the Raman filter to one of ends of the delivery fiber which one is located on an opposite side to the amplifying fiber; g2 represents gain which the Raman scattered light receives per unit length in the light path; am represents a reflection attenuation by the Raman filter; at represents a transmission attenuation by the Raman filter; and ar represents a reflection attenuation by a workpiece which is processable by the fiber laser device.

In one or more embodiments of the present invention, a method of setting, in a fiber laser device, a reflection attenuation ar by a workpiece which is processable by the fiber laser device, the fiber laser device including: an amplifying fiber; and a delivery fiber in which laser light that has been outputted from the amplifying fiber is guided, the method including the step of setting the reflection attenuation ar so that the following inequality (a) is satisfied:

$$10^{\frac{2\times g1\times L1-am}{10}} + 10^{\frac{2\times g1\times L1+2\times g2\times L2-2\times at-ar}{10}} < 10^{\frac{2\times g1\times L1+2\times g2\times L2-ar}{10}} \quad (a)$$

where: L1 represents a length of a light path from one of ends of the amplifying fiber which one is located on an opposite side to the delivery fiber to a Raman filter; g1 represents gain which Raman scattered light receives per unit length in the light path; L2 represents a length of a light path from the Raman filter to one of ends of the delivery fiber which one is located on an opposite side to the amplifying fiber; g2 represents gain which the Raman scattered light receives per unit length in the light path; am represents a reflection attenuation by the Raman filter; at represents a transmission attenuation by the Raman filter; and ar represents the reflection attenuation by the workpiece which is processable by the fiber laser device.

According to a fiber laser device in accordance with one or more embodiments of the present invention, it is possible to suppress an increase in power of Raman scattered light and thereby reduce a possibility that oscillation of laser light becomes unstable. Furthermore, according to a method of producing a fiber laser device in accordance with one or more embodiments of the present invention, it is possible to produce a fiber laser device in which an increase in power of Raman scattered light is suppressed and thereby a possibility that oscillation of laser light becomes unstable is reduced. Moreover, according to a setting method in accordance with one or more embodiments of the present invention, it is possible to realize a fiber laser device in which an increase in power of Raman scattered light is suppressed and thereby a possibility that oscillation of laser light becomes unstable is reduced.

BRIEF DESCRIPTION OF THE DRAWINGS

FIG. 3A illustrates the distribution of the power of the Raman scattered light in a case where a reflectance of a workpiece is 10%. FIG. 3B illustrates distribution of the power of the Raman scattered light in a case where the reflectance of the workpiece is 50%.

DETAILED DESCRIPTION

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

Embodiment 1

(Configuration of Fiber Laser Device)

Figure 1:
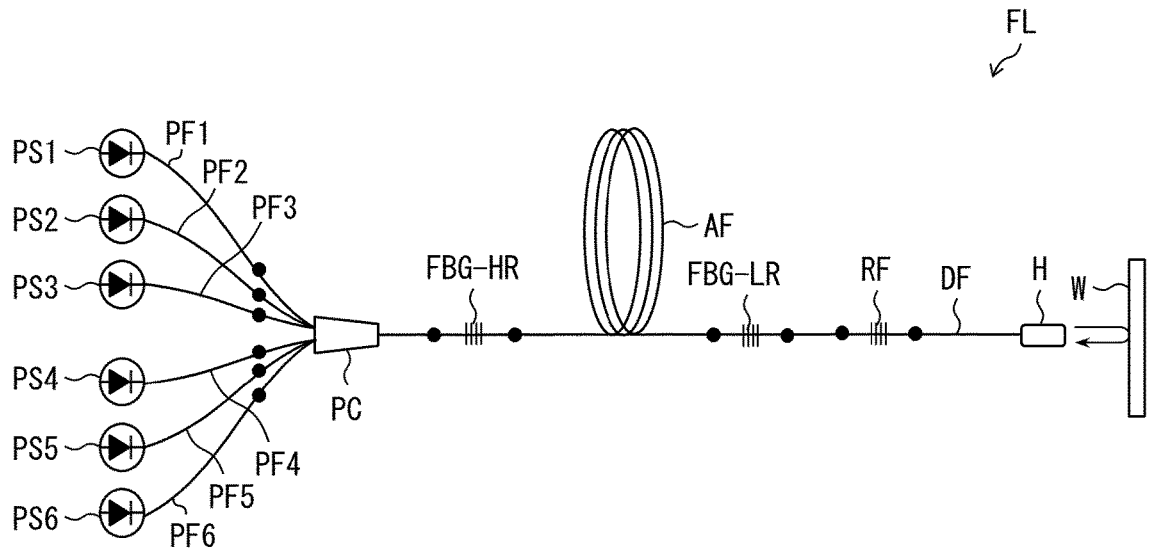
FIG. 1 is a block diagram illustrating a configuration of a fiber laser device in accordance with Embodiment 1.

The following description will discuss a configuration of a fiber laser device FL in accordance with Embodiment 1 of the present invention with reference to FIG. 1. FIG. 1 is a block diagram illustrating the configuration of the fiber laser device FL in accordance with Embodiment 1 of the present invention.

The fiber laser device FL is a laser device for processing which laser device includes a single amplifying fiber. The fiber laser device FL includes m excitation light sources PS1 through PSm, m excitation fibers PF1 through PFm, an excitation combiner PC, a high-reflection fiber Bragg grating FBG-HR, an amplifying fiber AF, a low-reflection fiber Bragg grating FBG-LR, a delivery fiber DF, and an irradiation head H, for example, as illustrated in FIG. 1. The excitation light sources PS1 through PSm correspond to the respective excitation fibers PF1 through PFm. Note, here, that "m" is any natural number of 2 or more and indicates the number of the excitation light sources PS1 through PSm and the number of the excitation fibers PF1 through PFm. Note that FIG. 1 illustrates an example of the configuration of the fiber laser device FL in a case where m=6.

An excitation light source PSj (j is a natural number of 1 or more and m or less) generates excitation light. In Embodiment 1, as each of the excitation light sources PS1 through PSm, a laser diode is employed. The excitation light source PSj is connected to an input end of an excitation fiber PFj. The excitation light which has been generated by the excitation light source PSj is inputted into the excitation fiber PFj.

The excitation light which has been generated by the excitation light source PSj is guided in the excitation fiber PFj (j is a natural number of 1 or more and m or less). An output end of the excitation fiber PFj is connected to an input port of the excitation combiner PC. The excitation light which has been guided in the excitation fiber PFj is inputted into the excitation combiner PC via the input port.

The excitation combiner PC combines the excitation light which has been guided in each of the excitation fibers PF1 through PFm. An output port of the excitation combiner PC is connected to an input end of the amplifying fiber AF via the high-reflection fiber Bragg grating FBG-HR. Of the excitation light which has been combined by the excitation combiner PC, excitation light which has passed through the high-reflection fiber Bragg grating FBG-HR is inputted into the amplifying fiber AF.

The amplifying fiber AF generates laser light with use of the excitation light which has passed through the high-reflection fiber Bragg grating FBG-HR. In Embodiment 1, as the amplifying fiber AF, a double cladding fiber is employed which includes a core that is doped with a rare earth element (for example, Yb). The excitation light which has passed through the high-reflection fiber Bragg grating FBG-HR is used to keep the rare earth element in a population inversion state. An output end of the amplifying fiber AF is connected to an input end of the delivery fiber DF via the low-reflection fiber Bragg grating FBG-LR. The high-reflection fiber Bragg grating FBG-HR functions as a mirror in a certain wavelength band (for example, a reflectance is 99%), and the low-reflection fiber Bragg grating FBG-LR functions as a half mirror in the certain wavelength band (for example, a reflectance is 10%). Therefore, the amplifying fiber AF constitutes, together with the high-reflection fiber Bragg grating FBG-HR and the low-reflection fiber Bragg grating FBG-LR, a resonator which oscillates laser light that belongs to a specific wavelength band. Of the laser light which has been generated by the amplifying fiber AF, laser light which has passed through the low-reflection fiber Bragg grating FBG-LR is inputted into the delivery fiber DF.

The laser light which has passed through the low-reflection fiber Bragg grating FBG-LR is guided in the delivery fiber DF. In Embodiment 1, as the delivery fiber DF, a single-mode fiber or a few-mode fiber is employed. An output end of the delivery fiber DF is connected to the irradiation head H. The laser light which has been guided in the delivery fiber DF is emitted to a workpiece W via the irradiation head H.

(Characteristics of Fiber Laser Device)

The fiber laser device FL in accordance with Embodiment 1 is characterized in that the fiber laser device FL includes a Raman filter RF for reflecting Stokes light generated by stimulated Raman scattering (hereinafter, referred to as "Raman scattered light"). In Embodiment 1, the Raman filter RF is provided to the delivery fiber DF. As the Raman filter RF, a fiber Bragg grating may be employed, a slanted fiber grating may be alternatively employed, or a long-period fiber Bragg grating may be alternatively employed. The Raman filter RF is designed so that a central wavelength of the Raman scattered light is included in a reflection bandwidth, and the Raman filter RF reflects part of the Raman scattered light which has entered the Raman filter RF and transmits part of the Raman scattered light which has entered the Raman filter RF.

Figure 2:
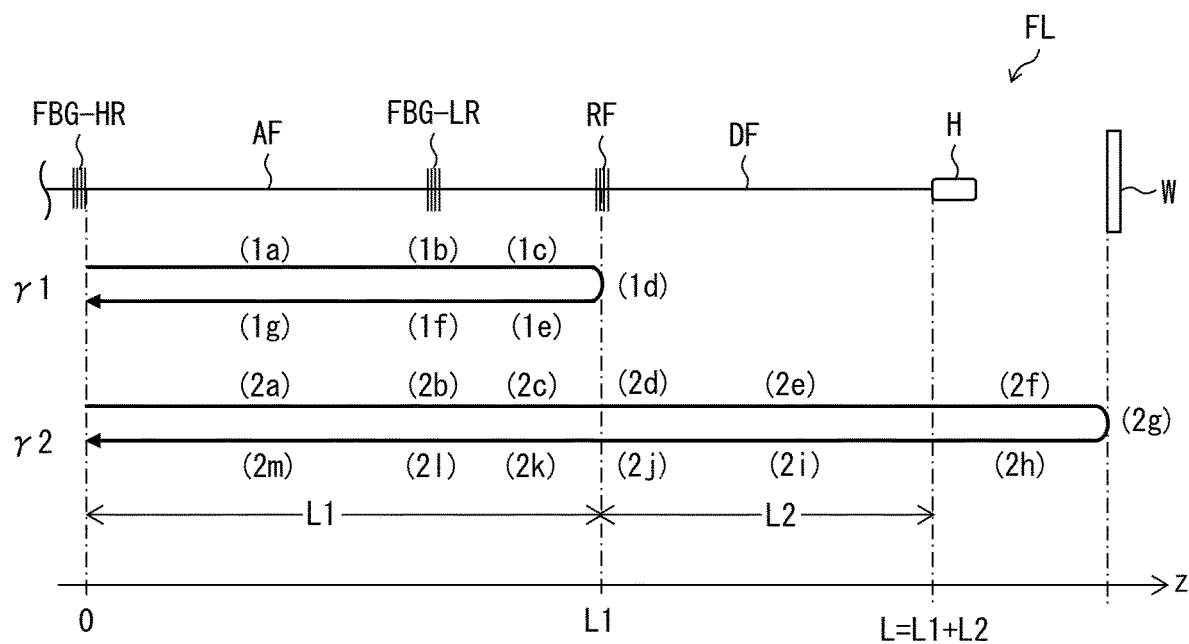
FIG. 2 is a drawing illustrating light paths of Raman scattered light in the fiber laser device illustrated in FIG. 1.

FIG. 2 is a drawing illustrating light paths of the Raman scattered light in the fiber laser device FL. As illustrated in FIG. 2, the Raman scattered light which has entered the amplifying fiber AF from the high-reflection fiber Bragg grating FBG-HR returns to the high-reflection fiber Bragg grating FBG-HR from the amplifying fiber AF along a first light path γ1 or a second light path γ2.

Note, here, that the first light path γ1 is a light path along which the Raman scattered light propagates as follows. Note that, in the following description, a "forward direction" indicates a direction identical to a direction in which the laser light is emitted from an end of the delivery fiber DF, and a "backward direction" indicates a direction opposite to the direction in which the laser light is emitted from the end of the delivery fiber DF (a direction in which reflected light that is reflected by the workpiece W is guided in the delivery fiber DF).

(1a) The Raman scattered light propagates in the amplifying fiber AF in the forward direction from the high-reflection fiber Bragg grating FBG-HR to the low-reflection fiber Bragg grating FBG-LR, (1b) passes through the low-reflection fiber Bragg grating FBG-LR, (1c) propagates in the delivery fiber DF in the forward direction from the low-reflection fiber Bragg grating FBG-LR to the Raman filter RF, (1d) is reflected by the Raman filter RF, (1e) propagates in the delivery fiber DF in the backward direction from the Raman filter RF to the low-reflection fiber Bragg grating FBG-LR, (1f) passes through the low-reflection fiber Bragg grating FBG-LR, and (1g) propagates in the amplifying fiber AF in the backward direction from the low-reflection fiber Bragg grating FBG-LR to the high-reflection fiber Bragg grating FBG-HR.

The Raman scattered light which propagates along the first light path γ1 receives gain in the above-described process (1a), process (1c), process (1e), and process (1g). In these processes, the gain which the Raman scattered light receives is $2 \times g1 \times L1$ [dB]. Here, L1 represents a length of a light path from one of ends of the amplifying fiber AF which one is located on an opposite side to the delivery fiber DF (connection point between the amplifying fiber AF and the high-reflection fiber Bragg grating FBG-HR) to the Raman filter RF, and g1 [dB] represents gain which the Raman scattered light receives per unit length in the light path. The Raman scattered light which propagates along the first light path γ1 also receives loss in the above-described process (1d). In this process, the loss which the Raman scattered light receives is am [dB]. Here, am [dB] represents a reflection attenuation by the Raman filter RF. Therefore, power of the Raman scattered light becomes $10^{(2 \times g1 \times L1 - am)/10}$ times greater than original power in a process of propagating along the first light path γ1.

On the other hand, the second light path γ2 is a light path along which the Raman scattered light propagates as follows.

(2a) The Raman scattered light propagates in the amplifying fiber AF in the forward direction from the high-reflection fiber Bragg grating FBG-HR to the low-reflection fiber Bragg grating FBG-LR, (2b) passes through the low-reflection fiber Bragg grating FBG-LR, (2c) propagates in the delivery fiber DF in the forward direction from the low-reflection fiber Bragg grating FBG-LR to the Raman filter RF, (2d) passes through the Raman filter RF, (2e) propagates in the delivery fiber DF in the forward direction from the Raman filter RF to the irradiation head H, (2f) propagates in air in the forward direction from the irradiation head H to the workpiece W, (2g) is reflected by the workpiece W, (2h) propagates in the air in the backward direction from the workpiece W to the irradiation head H, (2i) propagates in the delivery fiber DF in the backward direction from the irradiation head H to the Raman filter RF, (2j) passes through the Raman filter RF, (2k) propagates in the delivery fiber DF in the backward direction from the Raman filter RF to the low-reflection fiber Bragg grating FBG-LR, (2l) passes through the low-reflection fiber Bragg grating FBG-LR, and (2m) propagates in the amplifying fiber AF in the backward direction from the low-reflection fiber Bragg grating FBG-LR to the high-reflection fiber Bragg grating FBG-HR.

The Raman scattered light which propagates along the second light path γ2 receives gain in the above-described process (2a), process (2c), process (2e), process (2i), process (2k), and process (2m). In these processes, the gain which the Raman scattered light receives is $2 \times g1 \times L1 + 2 \times g2 \times L2$. Here, L2 represents a length of a light path from the Raman filter RF to one of ends of the delivery fiber DF which one is located on an opposite side to the amplifying fiber AF (connection point between the delivery fiber DF and the irradiation head H), and g2 [dB] represents gain which the Raman scattered light receives per unit length in the light path. The Raman scattered light which propagates along the second light path γ2 also receives loss in the above-described process (2d), process (2g), and process (2j). In these process, the loss which the Raman scattered light receives is $2 \times at + ar$. Here, at [dB] represents a transmission attenuation by the Raman filter RF, and ar [dB] represents a reflection attenuation by the workpiece W. Therefore, the power of the Raman scattered light becomes $10^{(2 \times g1 \times L1 + 2 \times g2 \times L2 - 2 \times at - ar)/10}$ times greater than the original power in a process of propagating along the second light path γ2.

As has been described, of the Raman scattered light which has entered the amplifying fiber AF from the high-reflection fiber Bragg grating FBG-HR, the Raman scattered light which propagates along the first light path γ1 and then returns to the high-reflection fiber Bragg grating FBG-HR has power that is $10^{(2 \times g1 \times L1 - am)/10}$ times greater than the original power. Of the Raman scattered light which has entered the amplifying fiber AF from the high-reflection fiber Bragg grating FBG-HR, the Raman scattered light which propagates along the second light path γ2 and then returns to the high-reflection fiber Bragg grating FBG-HR has power that is $10^{(2 \times g1 \times L1 + 2 \times g2 \times L2 - 2 \times at - ar)/10}$ times greater than the original power. Therefore, of the Raman scattered light which has entered the amplifying fiber AF from the high-reflection fiber Bragg grating FBG-HR, the Raman scattered light which returns to the high-reflection fiber Bragg grating FBG-HR has, in total, power that is $10^{(2 \times g1 \times L1 - am)/10} + 10^{(2 \times g1 \times L1 + 2 \times g2 \times L2 - 2 \times at - ar)/10}$ times greater than the original power.

By the way, in a case where the Raman filter RF is not present, the Raman scattered light which returns to the high-reflection fiber Bragg grating FBG-HR, of the Raman scattered light which has entered the amplifying fiber AF from the high-reflection fiber Bragg grating FBG-HR, has, in total, power that is $10^{(2 \times g1 \times L1 + 2 \times g2 \times L2 - ar)/10}$ times greater than the original power.

This is because, in this case, the Raman scattered light receives gain in (a) a process of propagating in the amplifying fiber AF in the forward direction from the high-reflection fiber Bragg grating FBG-HR to the low-reflection fiber Bragg grating FBG-LR, (b) a process of propagating in the delivery fiber DF in the forward direction from the low-reflection fiber Bragg grating FBG-LR to the irradiation head H, (c) a process of propagating in the delivery fiber DF in the backward direction from the irradiation head H to the low-reflection fiber Bragg grating FBG-LR, and (d) a process of propagating in the amplifying fiber AF in the backward direction from the low-reflection fiber Bragg grating FBG-LR to the high-reflection fiber Bragg grating FBG-HR, and the Raman scattered light receives loss in a process of being reflected by the workpiece W.

According to the fiber laser device FL in accordance with Embodiment 1, the Raman filter RF is provided so that the Raman scattered light which returns to the high-reflection fiber Bragg grating FBG-HR, of the Raman scattered light which has entered the amplifying fiber AF from the high-reflection fiber Bragg grating FBG-HR, has, in total, power lower than that in a case where the Raman filter RF is not present. That is, according to the fiber laser device FL in accordance with Embodiment 1, the Raman filter RF is provided so that the following inequality (1) is satisfied. Note, however, that in a case where the workpiece W is predetermined, ar can be a reflection attenuation by the workpiece W, and in a case where the workpiece W is not predetermined, ar can be a reflection attenuation by a processable workpiece W. Note also that in a case where a range of the reflection attenuation by the processable workpiece W is predetermined, ar can be a minimum value, a maximum value, a median value, or the like of the range.

$$10^{\frac{2\times g1\times L1-am}{10}} + 10^{\frac{2\times g1\times L1+2\times g2\times L2-2\times at-ar}{10}} < 10^{\frac{2\times g1\times L1+2\times g2\times L2-ar}{10}} \quad (1)$$

Note that it is possible to transform the inequality (1) into the following inequality (2) by dividing both sides of the inequality (1) by $10^{(2\times g1\times L1)/10}$.

$$10^{\frac{-am}{10}} + 10^{\frac{2\times g2\times L2-2\times at-ar}{10}} < 10^{\frac{2\times g2\times L2-ar}{10}} \quad (2)$$

Note also that it is possible to transform the inequality (2) into the following inequality (3) by substituting L2=L−L1 into the inequality (2). Here, L represents a length of a light path from the one of the ends of the amplifying fiber AF which one is located on the opposite side to the delivery fiber DF to the one of the ends of the delivery fiber DF which one is located on the opposite side to the amplifying fiber AF, and corresponds to a sum of the length L1 and the length L2. Hereinafter, L will be also referred to as a "total light path length".

$$10^{\frac{-am}{10}} + 10^{\frac{2\times g2\times (L-L1)-2\times at-ar}{10}} < 10^{\frac{2\times g2\times (L-L1)-ar}{10}} \quad (3)$$

Therefore, the fiber laser device FL in accordance with Embodiment 1 can be regarded as a fiber laser device in which the Raman filter RF is provided so that the inequality (2) is satisfied or can be alternatively regarded as a fiber laser device in which the Raman filter RF is provided so that the inequality (3) is satisfied.

Note that a configuration such that the Raman filter RF is provided so that the inequality (1) is satisfied includes: a mode in which the total light path length L and a position of the Raman filter RF are determined so that L1 and L2 satisfy the inequality (1); a mode in which, in a case where the total light path length L=L1+L2 is predetermined, the position of the Raman filter is determined so that L1 or L2 satisfies the inequality (1); and a mode in which the Raman filter RF is designed or selected so that am and at satisfy the inequality (1). Note also that a configuration such that the Raman filter RF is provided so that the inequality (2) is satisfied includes: a mode in which the position of the Raman filter RF is determined so that L2 satisfies the inequality (2); and a mode in which the Raman filter RF is designed or selected so that am and at satisfy the inequality (2). Note also that a configuration such that the Raman filter RF is provided so that the inequality (3) is satisfied includes: a mode in which the total light path length L and the position of the Raman filter RF are determined so that L and L1 satisfy the inequality (3); a mode in which, in a case where the total light path length L=L1+L2 is predetermined, the position of the Raman filter RF is determined so that L1 satisfies the inequality (3); and a mode in which the Raman filter RF is designed or selected so that am and at satisfy the inequality (3).

In this manner, according to the fiber laser device FL in accordance with Embodiment 1, the Raman filter RF is provided so that any of the inequalities (1) through (3) is satisfied. Therefore, according to the fiber laser device FL in accordance with Embodiment 1, it is possible to suppress an increase in power of the Raman scattered light and thereby reduce a possibility that oscillation of the laser light becomes unstable.

Note that it is assumed here that the gain g1, which the Raman scattered light receives per unit length in the light path from the high-reflection fiber Bragg grating FBG-HR to the Raman filter RF, and the gain g2, which the Raman scattered light receives in the light path from the Raman filter RF to the irradiation head H, are each constant, but the present invention is not limited to such a configuration. That is, gain which the Raman scattered light receives per unit length can be given as a function g(P(z)) of a light path length z from an emitting end of the high-reflection fiber Bragg grating FBG-HR. Here, P(z) is power of the laser light at a point at which the light path length from the emitting end of the high-reflection fiber Bragg grating FBG-HR is z, and g(P(z)) is the gain which the Raman scattered light receives per unit length at the point. In this case, the gain g1×L1 and the gain g2×L2 which appear in the above inequalities can be replaced with the following integral expressions (4) and (5), respectively.

$$g1\times L1 \to \int_0^{L1} g(P(z))dz \quad (4)$$

$$g2\times L2 \to \int_{L1}^{L1+L2} g(P(z))dz \quad (5)$$

In this case, the inequalities (1) and (2) can be expressed by the following inequalities (6) and (7), respectively.

$$10^{\frac{2\times \int_0^{L1} g(P(z))dz-am}{10}} + 10^{\frac{2\times \int_0^{L1} g(P(z))dz+2\times \int_{L1}^{L1+L2} g(P(z))dz-2\times at-ar}{10}} < \\ 10^{\frac{2\times \int_0^{L1} g(P(z))dz+2\times \int_{L1}^{L1+L2} g(P(z))dz-ar}{10}} \quad (6)$$

$$10^{\frac{-am}{10}} + 10^{\frac{2\times \int_{L1}^{L1+L2} g(P(z))dz-2\times at-ar}{10}} < 10^{\frac{2\times \int_{L1}^{L1+L2} g(P(z))dz-ar}{10}} \quad (7)$$

Therefore, the fiber laser device FL in accordance with Embodiment 1 can be regarded as a fiber laser device in which the Raman filter RF is provided so that the inequality (6) is satisfied or can be alternatively regarded as a fiber laser device in which the Raman filter RF is provided so that the inequality (7) is satisfied.

Note that, in a case where transmission loss by the high-reflection fiber Bragg grating FBG-HR is ignored, the power P(z) is given by the following equality (9) with use of $r'_{oc}$ defined by the following equality (8). Here, L0 is a length of the amplifying fiber AF, $r_{oc}$ is a reflection attenuation by the low-reflection fiber Bragg grating FBG-LR, toc is a transmission attenuation by the low-reflection fiber Bragg grating FBG-LR, and P is the power of the laser light outputted from the amplifying fiber via the fiber Bragg grating. Note that $r'_{oc}$ is an apparent reflection attenuation by the fiber Bragg grating FBG-LR which apparent reflection attenuation results from an effect of reflection by a surface of the workpiece W.

$$r'_{oc} = 10 \times \log_{10}\left(10^{\frac{r_{oc}}{10}} + 10^{\frac{2t_{oc}+ar}{10}}\right) \quad (8)$$

$$P(z) = P \times \left(10^{\frac{r'_{oc}}{20 \times L0} \times (L0-z)} + 10^{\frac{r'_{oc}}{20 \times L0} \times (L0+z)}\right) \quad (9)$$

Note that, in the fiber laser device FL in accordance with Embodiment 1, the Raman filter RF may be provided so that the inequality (10) is further satisfied.

$$2\int_{L1}^{L1+L2} g(P(z))dz - ar - am < 0 \quad (10)$$

In a case where the Raman filter RF is provided so that the inequality (10) is further satisfied, it is difficult for both of two resonators, which are formed on respective both sides of the Raman filter RF, to satisfy an oscillation condition. Therefore, according to the fiber laser device FL which is designed so that the inequality (10) is satisfied, it is possible to further suppress an increase in power of the Raman scattered light and thereby further reduce a possibility that the oscillation of the laser light becomes unstable. The two resonators can be, for example, (i) a resonator which is constituted by the light path from the high-reflection fiber Bragg grating FBG-HR to the Raman filter RF and (ii) a resonator which is constituted by a light path from the Raman filter RF to the workpiece W. In this case, in the two resonators constituted by these light paths, the high-reflection fiber Bragg grating FBG-HR may function as a mirror which is paired with the Raman filter RF or alternatively a material of the amplifying fiber AF which material scatters the Raman scattered light may function as the mirror.

In the fiber laser device FL in accordance with Embodiment 1, the Raman filter RF may be constituted by a slanted fiber Bragg grating. According to a slanted fiber Bragg grating, since part of light which propagates in a core can couple into a cladding mode, it is possible to cause a sum of an absolute value of a reflectance with respect to Raman scattered light and an absolute value of a transmittance with respect to the Raman scattered light to be lower than 1 (one). Therefore, in a case where the Raman filter RF is constituted by a slanted fiber Bragg grating, it is possible to avoid a design constraint which can arise in a case where a sum of an absolute value of a reflectance with respect to the Raman scattered light and an absolute value of a transmittance with respect to the Raman scattered light is 1 (one).

Furthermore, in the fiber laser device FL in accordance with Embodiment 1, the Raman filter RF may be constituted by a long-period fiber Bragg grating. According to a long-period fiber Bragg grating, since part of light which propagates in a core can couple into a cladding mode, it is possible to cause a sum of an absolute value of a reflectance with respect to Raman scattered light and an absolute value of a transmittance with respect to the Raman scattered light to be lower than 1 (one). Therefore, in a case where the Raman filter RF is constituted by a long-period fiber Bragg grating, it is possible to avoid a design constraint which can arise in a case where the sum of the absolute value of the reflectance with respect to the Raman scattered light and the absolute value of the transmittance with respect to the Raman scattered light is 1 (one).

Note that, in the fiber laser device FL in accordance with Embodiment 1, a few-mode fiber may be employed as the amplifying fiber AF or the delivery fiber DF. Alternatively, as the amplifying fiber AF or the delivery fiber DF, a partially-doped fiber may be employed. Alternatively, as the amplifying fiber AF, an amplifying fiber may be employed which does not include a Raman reflecting part that reflects Raman scattered light.

EXAMPLE

As an Example of the fiber laser device FL, a fiber laser device FL was prepared which was configured such that a length L of a light path from a high-reflection fiber Bragg grating FBG-HR to an irradiation head H was 24 m. According to the fiber laser device FL, a length L1 of a light path from the high-reflection fiber Bragg grating FBG-HR to a Raman filter RF was 18 m, and gain g1 which Raman scattered light received per unit length in the light path was 1.2 dB/m. Further, according to the fiber laser device FL, a length L2 of a light path from the Raman filter RF to the irradiation head H was 6 m, and gain g2 which the Raman scattered light received per unit length in the light path was 1.2 dB/m. As the Raman filter RF, a fiber Bragg grating was employed which was configured such that, in a reflection bandwidth including a central wavelength of the Raman scattered light, a reflection attenuation am was 0.5 dB and a transmission attenuation at was 10 dB.

Figure 3A:
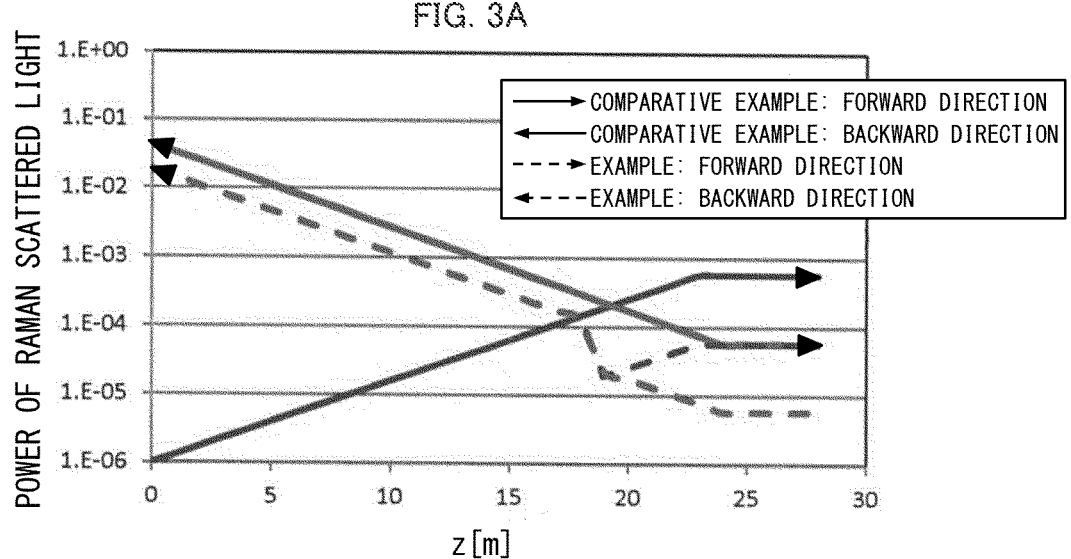
FIGS. 3A and 3B are a drawing illustrating distribution of power of the Raman scattered light in the fiber laser device illustrated in FIG. 1.
Figure 3B:
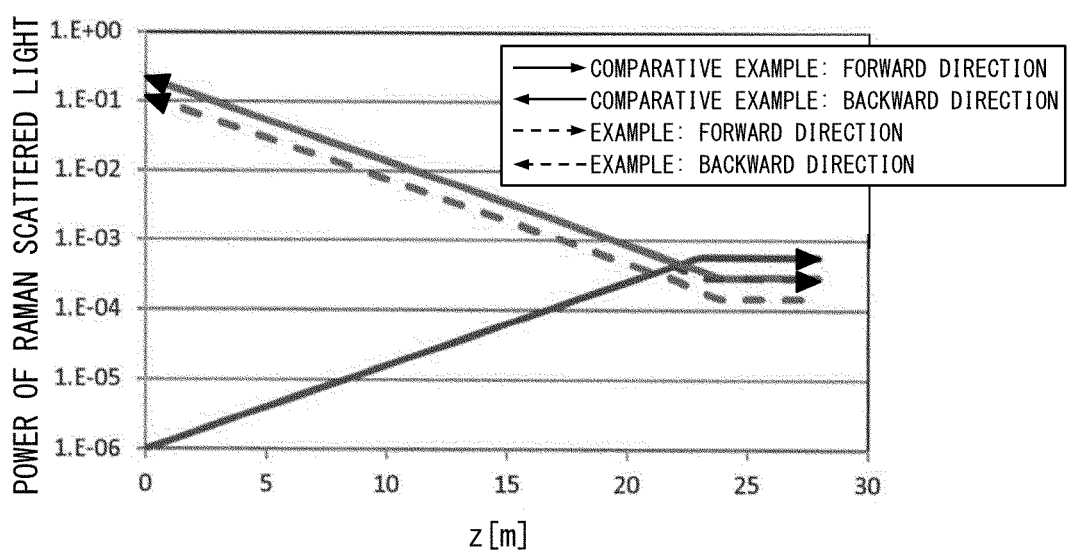

FIGS. 3A-3B show results of determining, by numerical calculation, distribution of power of the Raman scattered light which propagated in a forward direction and a backward direction in the fiber laser device FL in accordance with the present Example. FIG. 3A is the distribution of the power of the Raman scattered light in a case where a reflectance of a workpiece W was 10% (a reflection attenuation ar was 10 dB). FIG. 3B is the distribution of the power of the Raman scattered light in a case where the reflectance of the workpiece W was 50% (the reflection attenuation ar was 3 dB). FIG. 3A and FIG. 3B each show distribution of power of Raman scattered light in a fiber laser device in accordance with a Comparative Example (solid line), in addition to the distribution of the power of the Raman scattered light in the fiber laser device FL in accordance with the present Example (dotted line). Note, here, that the fiber laser device in accordance with the Comparative Example indicates a fiber laser device obtained by removing the Raman filter RF from the fiber laser device FL in accordance with the present Example.

According to FIGS. 3A-3B, even in a case where the reflectance of the workpiece W was 10% or even in a case where the reflectance of the workpiece W was 50%, the following fact was found. That is, it was found that the power of the Raman scattered light which returned to the high-reflection fiber Bragg grating FBG-HR in the fiber laser device FL in accordance with Example 1 was lower than that of the Raman scattered light which returned to a high-reflection fiber Bragg grating FBG-HR in the fiber laser device in accordance with the Comparative Example.

Embodiment 2

(Configuration of Fiber Laser Device)

Figure 4:
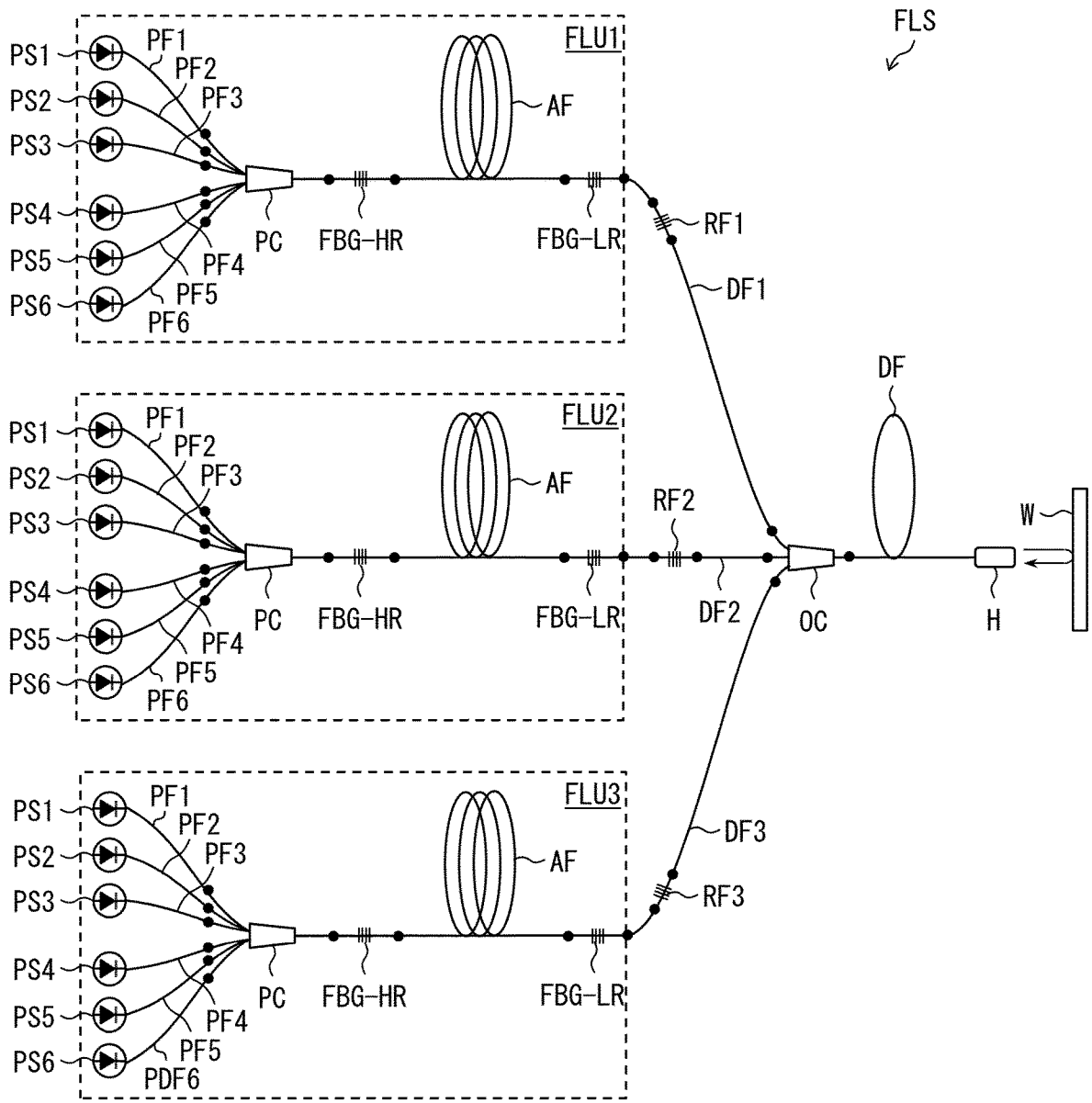
FIG. 4 is a block diagram illustrating a configuration of a fiber laser device in accordance with Embodiment 2.

The following description will discuss a configuration of a fiber laser device FLS in accordance with Embodiment 2 of the present invention with reference to FIG. 4. FIG. 4 is a block diagram illustrating the configuration of the fiber laser device FLS in accordance with Embodiment 2.

The fiber laser device FLS is a laser device for processing which laser device includes a plurality of amplifying fibers. The fiber laser device FLS includes n fiber laser units FLU1 through FLUn, n delivery fibers DF1 through DFn, an output combiner OC, a delivery fiber DF, and an irradiation head H, for example, as illustrated in FIG. 4. The fiber laser units FLU1 through FLUn correspond to the respective delivery fibers DF1 through DFn. Note, here, that "n" is any natural number of 2 or more and indicates the number of the fiber laser units FLU1 through FLUn, the number of the delivery fibers DF1 through DFn, and the number of Raman filters RF1 through RFn (later described). Note that FIG. 4 illustrates an example of the configuration of the fiber laser device FLS in a case where n=3.

A fiber laser unit FLUi (i is a natural number of 1 or more and n or less) generates laser light. Similarly to the fiber laser device FL in accordance with Embodiment 1, the fiber laser unit FLUi includes m excitation light sources PS1 through PSm, m excitation fibers PF1 through PFm, an excitation combiner PC, a high-reflection fiber Bragg grating FBG-HR, an amplifying fiber AF, and a low-reflection fiber Bragg grating FBG-LR. The low-reflection fiber Bragg grating FBG-LR of the fiber laser unit FLUi is connected to an input end of a delivery fiber DFi. The laser light which has been generated by the fiber laser unit FLUi is inputted into the delivery fiber DFi.

The laser light which has been generated in the fiber laser unit FLUi is guided in the delivery fiber DFi (i is a natural number of 1 or more and n or less). In Embodiment 2, as each of the delivery fibers DF1 through DFn, a single-mode fiber or a few-mode fiber is employed. An output end of the delivery fiber DFi is connected to an input port of the output combiner OC. The laser light which has been guided in the delivery fiber DFi is inputted into the output combiner OC via the input port.

The output combiner OC combines the laser light which has been guided in each of the delivery fibers DF1 through DFn. An output port of the output combiner OC is connected to an input end of the delivery fiber DF. The laser light which has been combined by the output combiner OC is inputted into the delivery fiber DF.

The laser light which has been combined by the output combiner OC is guided in the delivery fiber DF. In Embodiment 2, as the delivery fiber DF, a multimode fiber is employed. An output end of the delivery fiber DF is connected to the irradiation head H. The laser light which has been guided in the delivery fiber DF is emitted to a workpiece W via the irradiation head H.

(Characteristics of Fiber Laser Device)

The fiber laser device FLS is characterized in that the fiber laser device FLS includes the Raman filters RF1 through RFn each for reflecting Stokes light generated by stimulated Raman scattering (hereinafter, referred to as "Raman scattered light"). In Embodiment 2, a Raman filter RFi (i is a natural number of 1 or more and n or less) is provided to the delivery fiber DFi. As each of the Raman filters RF1 through RFn, a fiber Bragg grating may be employed, a slanted fiber grating may be alternatively employed, or a long-period fiber Bragg grating may be alternatively employed. Each of the Raman filters RF1 through RFn is designed so that a central wavelength of the Raman scattered light is included in a reflection bandwidth, and each of the Raman filters RF1 through RFn reflects part of the Raman scattered light which has entered the each of the Raman filters RF1 through RFn and transmits part of the Raman scattered light which has entered the each of the Raman filters RF1 through RFn.

Figure 5:
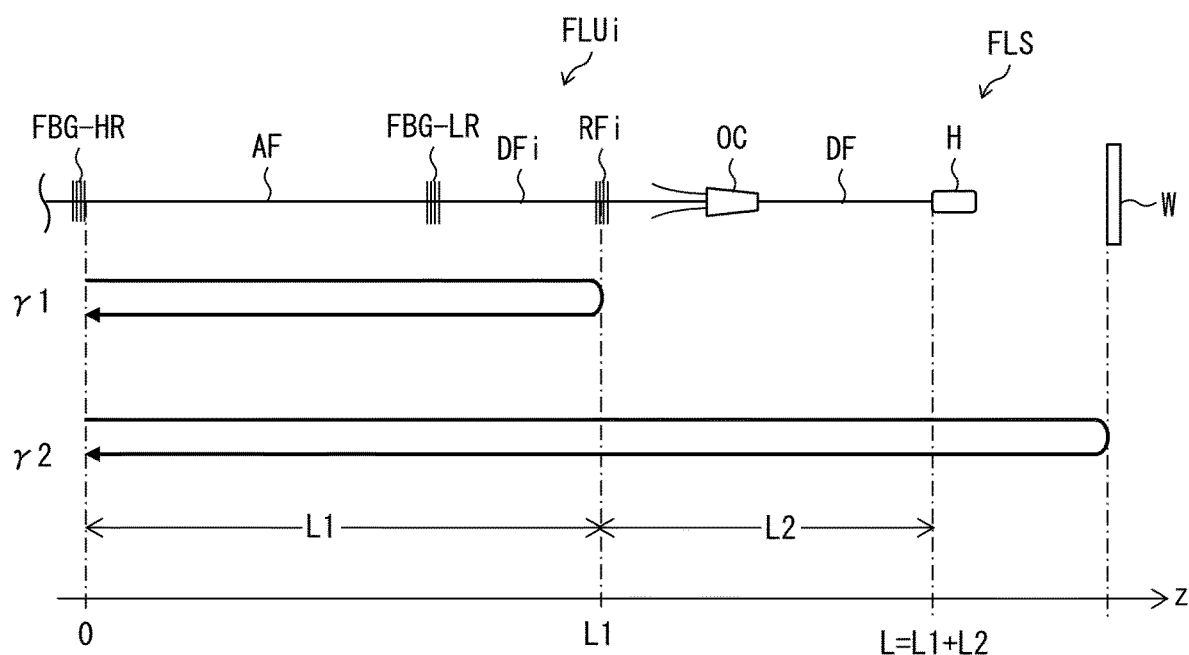
FIG. 5 is a drawing illustrating light paths of Raman scattered light in the fiber laser device illustrated in FIG. 4.

FIG. 5 is a drawing illustrating light paths of the Raman scattered light in the fiber laser device FLUi. As illustrated in FIG. 5, the Raman scattered light which has entered the amplifying fiber AF from the high-reflection fiber Bragg grating FBG-HR returns to the high-reflection fiber Bragg grating FBG-HR along a first light path γ1 or a second light path γ2.

According to the fiber laser device FLS in accordance with Embodiment 2, the Raman filter RFi is provided so that the Raman scattered light which returns to the high-reflection fiber Bragg grating FBG-HR has, in total, power lower than that in a case where the Raman filter RFi is not present. That is, according to the fiber laser device FLS in accordance with Embodiment 2, the Raman filter RFi is provided so that the following inequality (1) is satisfied.

$$10^{\frac{2\times g1\times L1-am}{10}} + 10^{\frac{2\times g1\times L1+2\times g2\times L2-2\times at-ar}{10}} < 10^{\frac{2\times g1\times L1+2\times g2\times L2-ar}{10}} \quad (11)$$

Here, L1 represents a length of a light path from one of ends of the amplifying fiber AF which one is located on an opposite side to the delivery fiber DF (connection point between the amplifying fiber AF and the high-reflection fiber Bragg grating FBG-HR) to the Raman filter RFi, and g1 [dB] represents gain which the Raman scattered light receives per unit length in the light path. L2 represents a length of a light path from the Raman filter RFi to one of ends of the delivery fiber DF which one is located on an opposite side to the amplifying fiber AF (connection point between the delivery fiber DF and the irradiation head H), and g2 [dB] represents gain which the Raman scattered light receives per unit length in the light path. Further, am [dB] represents a reflection attenuation by the Raman filter RFi, and at [dB] represents a transmission attenuation by the Raman filter RFi. Further, ar [dB] represents a reflection attenuation by the workpiece W.

Note that it is possible to transform the inequality (11) into the following inequality (12) by dividing both sides of the inequality (11) by $10^{(2\times g1\times L1)/10}$.

$$10^{\frac{-am}{10}} + 10^{\frac{2\times g2\times L2-2\times at-ar}{10}} < 10^{\frac{2\times g2\times L2-ar}{10}} \quad (12)$$

Note also that it is possible to transform the inequality (12) into the following inequality (13) by substituting L2=L−L1 into inequality (12). Here, L represents a length of a light path from the one of the ends of the amplifying fiber AF which one is located on the opposite side to the delivery fiber DF to the one of the ends of the delivery fiber DF which one is located on the opposite side to the amplifying fiber AF, and corresponds to a sum of the length L1 and the length L2.

$$10^{\frac{-am}{10}} + 10^{\frac{2\times g2\times (L-L1)-2\times at-ar}{10}} < 10^{\frac{2\times g2\times (L-L1)-ar}{10}} \quad (13)$$

Therefore, the fiber laser device FLS in accordance with Embodiment 2 can be regarded as a fiber laser device in which the Raman filter RFi is provided so that the inequality (12) is satisfied or can be alternatively regarded as a fiber laser device in which the Raman filter RFi is provided so that the inequality (13) is satisfied.

In this manner, according to the fiber laser device FLS in accordance with Embodiment 2, the Raman filter RFi is provided so that any of the inequalities (1) through (3) is satisfied. Therefore, according to the fiber laser device FLS in accordance with Embodiment 2, it is possible to suppress an increase in power of the Raman scattered light and thereby reduce a possibility that oscillation of the laser light becomes unstable.

Note that it is assumed here that the gain g1, which the Raman scattered light receives per unit length in the light path from the high-reflection fiber Bragg grating FBG-HR to the Raman filter RFi, and the gain g2, which the Raman scattered light receives in the light path from the Raman filter RFi to the irradiation head H, are each constant, but the present invention is not limited to such a configuration. That is, gain which the Raman scattered light receives per unit length can be given as a function g(P(z)) of a light path length z from an emitting end of the high-reflection fiber Bragg grating FBG-HR. Here, P(z) is power of the laser light at a point at which the light path length from the emitting end of the high-reflection fiber Bragg grating FBG-HR is z. In this case, the gain g1×L1 and the gain g2×L2 which appear in the above inequalities can be generalized to the following expressions (14) and (15), respectively.

$$g1 \times L1 \rightarrow \int_0^{L1} g(P(z))dz \quad (14)$$

$$g2 \times L2 \rightarrow \int_{L1}^{L1+L2} g(P(z))dz \quad (15)$$

In this case, the inequalities (11) and (12) can be generalized to the following inequalities (16) and (17), respectively.

$$10^{\frac{2\times\int_0^{L1} g(P(z))dz - am}{10}} + 10^{\frac{2\times\int_0^{L1} g(P(z))dz + 2\times\int_{L1}^{L1+L2} g(P(z))dz - 2\times at - ar}{10}} < 10^{\frac{2\times\int_0^{L1} g(P(z))dz + 2\times\int_{L1}^{L1+L2} g(P(z))dz - ar}{10}} \quad (16)$$

$$10^{\frac{-am}{10}} + 10^{\frac{2\times\int_{L1}^{L1+L2} g(P(z))dz - 2\times at - ar}{10}} < 10^{\frac{2\times\int_{L1}^{L1+L2} g(P(z))dz - ar}{10}} \quad (17)$$

Therefore, the fiber laser device FL in accordance with Embodiment 2 can be regarded as a fiber laser device in which the Raman filter RFi is provided so that the inequality (16) is satisfied or can be alternatively regarded as a fiber laser device in which the Raman filter RFi is provided so that the inequality (17) is satisfied.

Note that, in a case where transmission loss by the high-reflection fiber Bragg grating FBG-HR is ignored, the power P(z) is given by the following equality (19) with use of $r'_{oc}$ defined by the following equality (18). Here, L0 is a length of the amplifying fiber AF, $r_{oc}$ is a reflection attenuation by the low-reflection fiber Bragg grating FBG-LR, and toc is a transmission attenuation by the low-reflection fiber Bragg grating FBG-LR.

$$r'_{oc} = 10 \times \log_{10}\left(10^{\frac{r_{oc}}{10}} + 10^{\frac{2t_{oc}+ar}{10}}\right) \quad (18)$$

$$P(z) = P \times \left(10^{\frac{r'_{oc}}{20 \times L0} \times (L0-z)} + 10^{\frac{r'_{oc}}{20 \times L0} \times (L0+z)}\right) \quad (19)$$

Note that, in the fiber laser device FLS in accordance with Embodiment 2, the Raman filter RFi is may be provided so that the inequality (20) is further satisfied.

$$2\int_{L1}^{L1+L2} g(P(z))dz - ar - am < 0 \quad (20)$$

In a case where the Raman filter RFi is provided so that the inequality (20) is satisfied, it is difficult for both of two resonators, which are formed on respective both sides of the Raman filter RFi, to satisfy an oscillation condition. Therefore, according to the fiber laser device FLS in which the Raman filter RFi is provided so that the inequality (20) is satisfied, it is possible to further suppress an increase in power of the Raman scattered light and thereby further reduce a possibility that the oscillation of the laser light becomes unstable.

Furthermore, in the fiber laser device FLS in accordance with Embodiment 2, the Raman filter RFi may be constituted by a slanted fiber Bragg grating. In this case, it is possible to avoid a design constraint which can arise in a case where a sum of an absolute value of a reflectance with respect to the Raman scattered light and an absolute value of a transmittance with respect to the Raman scattered light is 1 (one).

Furthermore, in the fiber laser device FLS in accordance with Embodiment 2, the Raman filter RFi may be constituted by a long-period fiber Bragg grating. In this case, it is possible to avoid a design constraint which can arise in a case where the sum of the absolute value of the reflectance with respect to the Raman scattered light and the absolute value of the transmittance with respect to the Raman scattered light is 1 (one).

Note that, in the fiber laser device FLS in accordance with Embodiment 2, a few-mode fiber may be employed as the amplifying fiber AF, the delivery fiber DFi, or the delivery fiber DF. Alternatively, as the amplifying fiber AF, the delivery fiber DFi, or the delivery fiber DF, a partially-doped fiber may be employed. Alternatively, as the amplifying fiber AF, an amplifying fiber may be employed which does not include a Raman reflecting part that reflects Raman scattered light.

[Production Method]

The fiber laser device FL in accordance with Embodiment 1 can be produced by a production method including a step of providing the Raman filter RF so that the inequality (1), (2), (3), (6), or (7) is satisfied. According to the production method, it is possible to produce the fiber laser FL in which an increase in power of the Raman scattered light is suppressed and thereby a possibility that the oscillation of the laser light becomes unstable is reduced. The step of providing the Raman filter RF can be carried out so that the inequality (10) is further satisfied. In this case, it is possible to produce the fiber laser device FL in which an increase in power of the Raman scattered light is further suppressed and thereby a possibility that the oscillation of the laser light becomes unstable is further reduced.

The fiber laser device FLS in accordance with Embodiment 2 can be produced by a production method including a step of providing the Raman filter RFi so that the inequality (11), (12), (13), (16), or (17) is satisfied. According to the production method, it is possible to produce the fiber laser FLS in which an increase in power of the Raman scattered light is suppressed and thereby a possibility that the oscillation of the laser light becomes unstable is reduced. The step of providing the Raman filter RFi can be carried out so that the inequality (20) is further satisfied. In this case, it is possible to produce the fiber laser device FLS in which an increase in power of the Raman scattered light is further suppressed and thereby a possibility that the oscillation of the laser light becomes unstable is further reduced.

[Setting Method]

The inequality (1), (2), (3), (6), or (7) can be applied to a setting method of setting, in the fiber laser device FL in accordance with Embodiment 1, the reflection attenuation ar by the processable workpiece. That is, by setting the reflection attenuation ar so that the inequality (1), (2), (3), (6), or (7) is satisfied, it is possible to realize the fiber laser FL in which an increase in power of the Raman scattered light is suppressed and thereby a possibility that the oscillation of the laser light becomes unstable is reduced. A step of setting the reflection attenuation ar can be carried out so that the inequality (10) is further satisfied. In this case, it is possible to realize the fiber laser device FL in which an increase in power of the Raman scattered light is further suppressed and thereby a possibility that the oscillation of the laser light becomes unstable is further reduced.

The inequality (11), (12), (13), (16), or (17) can be applied to a setting method of setting, in the fiber laser device FLS in accordance with Embodiment 2, a reflection attenuation ar by a processable workpiece. That is, by setting the reflection attenuation ar so that the inequality (11), (12), (13), (16), or (17) is satisfied, it is possible to realize the fiber laser FLS in which an increase in power of the Raman scattered light is suppressed and thereby a possibility that the oscillation of the laser light becomes unstable is reduced. A step of setting the reflection attenuation ar can be carried out so that the inequality (20) is further satisfied. In this case, it is possible to realize the fiber laser device FLS in which an increase in power of the Raman scattered light is further suppressed and thereby a possibility that the oscillation of the laser light becomes unstable is further reduced.

[MOPA Fiber Laser Device]

In Embodiments 1 and 2, the fiber laser devices FL and FLS, each of which is of a resonator type, have been described. However, the present invention is not limited to such a type. For example, one or more embodiments of the present invention can be applied to a fiber laser device of an MOPA (Master Oscillator-Power Amplifier) type. Note, here, that this MOPA fiber laser device is a fiber laser device which includes: a laser light source which functions as an MO part; a fiber amplifier which functions as a PA part; and a delivery fiber. According to the MOPA fiber laser device, laser light which has been outputted from an amplifying fiber that constitutes the PA part (fiber amplifier) is guided in the delivery fiber and then emitted to a workpiece. Therefore, similarly to the fiber laser devices in accordance with Embodiments 1 and 2, by providing a Raman filter to the MOPA fiber laser device, it is possible to suppress an increase in power of Raman scattered light and thereby reduce a possibility that oscillation of the laser light becomes unstable. Note that, according to a fiber laser device of a resonator type, a delivery fiber is connected to a downstream end of an amplifying fiber via a fiber Bragg grating (the low-reflection fiber Bragg grating FBG-LR in Embodiments 1 and 2), whereas, according to a fiber laser device of an MOPA type, a delivery fiber is connected to a downstream end of an amplifying fiber without a fiber Bragg grating.

A fiber laser device (FL, FLS) in accordance with one or more embodiments of the present invention including: an amplifying fiber (AF); a delivery fiber (DF) in which laser light that has been outputted from the amplifying fiber (AF) is guided; and a Raman filter (RF, RF1 through RFn) which reflects part of Raman scattered light that is generated by stimulated Raman scattering caused to the laser light, the Raman filter (RF, RF1 through RFn) being provided so that the following inequality (a) is satisfied:

$$10^{\frac{2\times g1\times L1-am}{10}} + 10^{\frac{2\times g1\times L1+2\times g2\times L2-2\times at-ar}{10}} < 10^{\frac{2\times g1\times L1+2\times g2\times L2-ar}{10}} \quad (a)$$

where: L1 represents a length of a light path from one of ends of the amplifying fiber (AF) which one is located on an opposite side to the delivery fiber (DF) to the Raman filter (RF, RF1 through RFn); g1 represents gain which the Raman scattered light receives per unit length in the light path; L2 represents a length of a light path from the Raman filter (RF, RF1 through RFn) to one of ends of the delivery fiber (DF) which one is located on an opposite side to the amplifying fiber (AF); g2 represents gain which the Raman scattered light receives per unit length in the light path; am represents a reflection attenuation by the Raman filter (RF, RF1 through RFn); at represents a transmission attenuation by the Raman filter (RF, RF1 through RFn); and ar represents a reflection attenuation by a workpiece which is processable by the fiber laser device (FL, FLS).

The fiber laser device (FL, FLS) in accordance with one or more embodiments of the present invention is arranged such that the Raman filter (RF, RF1 through RFn) is provided so that, instead of the inequality (a), the following inequality (b) is satisfied:

$$10^{\frac{-am}{10}} + 10^{\frac{2\times g2\times L2-2\times at-ar}{10}} < 10^{\frac{2\times g2\times L2-ar}{10}}. \quad (b)$$

The fiber laser device (FL, FLS) in accordance with one or more embodiments of the present invention is arranged such that the Raman filter (RF, RF1 through RFn) is provided so that, instead of the inequality (a), the following inequality (c) is satisfied:

$$10^{\frac{-am}{10}} + 10^{\frac{2\times g2\times (L-L1)-2\times at-ar}{10}} < 10^{\frac{2\times g2\times (L-1)-ar}{10}} \quad (c)$$

where L represents a length of a light path from the one of the ends of the amplifying fiber (AF) which one is located on the opposite side to the delivery fiber (DF) to the one of the ends of the delivery fiber (DF) which one is located on the opposite side to the amplifying fiber (AF).

The fiber laser device (FL, FLS) in accordance with one or more embodiments of the present invention may be arranged such that the Raman filter (RF, RF1 through RFn) is provided so that the following inequality (d) is further satisfied:

$$2\int_{L1}^{L1+L2} g(P(z))dz - ar - am < 0 \quad (d)$$

where: P(z) represents power of the laser light at a point at which a light path length from the one of the ends of the amplifying fiber (AF) which one is located on the opposite side to the delivery fiber (DF) is z; and g(P(z)) represents gain which the Raman scattered light receives per unit length at the point.

The fiber laser device (FL, FLS) in accordance with one or more embodiments of the present invention may be arranged so as to further include a fiber Bragg grating (FBG-LR) which is provided to one of the ends of the amplifying fiber (AF) which one is located on a delivery fiber side (DF), the P(z) being given by the following equality (f) with use of r'$_{oc}$, which is defined by the following equality (e):

$$r'_{oc} = 10 \times \log_{10}\left(10^{\frac{r_{oc}}{10}} + 10^{\frac{2t_{oc}+ar}{10}}\right) \quad (e)$$

$$P(z) = P \times \left(10^{\frac{r'_{oc}}{20 \times L0} \times (L0-z)} + 10^{\frac{r'_{oc}}{20 \times L0} \times (L0+z)}\right) \quad (f)$$

where: L0 represents a length of the amplifying fiber (AF); r$_{oc}$ represents a reflection attenuation by the fiber Bragg grating (FBG-LR); toc is a transmission attenuation by the fiber Bragg grating (FBG-LR); and P is the power of the laser light outputted from the amplifying fiber (AF) via the fiber Bragg grating (FBG-LR).

The fiber laser device (FLS) in accordance with one or more embodiments of the present invention may be arranged so as to further include: a plurality of amplifying fibers (AF) which include the amplifying fiber (AF); and a combiner which combines the laser light that has been outputted from each of the plurality of amplifying fibers (AF), the delivery fiber (DF) including: delivery fibers in each of which the laser light that has been outputted from a corresponding one of the plurality of amplifying fibers (AF) is guided to the combiner; and a delivery fiber in which the laser light that has been combined by the combiner is guided.

A production method in accordance with one or more embodiments of the present invention is a method of producing a fiber laser device (FL, FLS) which includes: an amplifying fiber (AF); a delivery fiber (DF) in which laser light that has been outputted from the amplifying fiber (AF) is guided; and a Raman filter (RF, RF1 through RFn) which reflects part of Raman scattered light that is generated by stimulated Raman scattering caused to the laser light, the method including the step of providing the Raman filter (RF, RF1 through RFn) so that the following inequality (a) is satisfied:

$$10^{\frac{2 \times g1 \times L1 - am}{10}} + 10^{\frac{2 \times g1 \times L1 + 2 \times g2 \times L2 - 2 \times at - ar}{10}} < 10^{\frac{2 \times g1 \times L1 + 2 \times g2 \times L2 - ar}{10}} \quad (a)$$

where: L1 represents a length of a light path from one of ends of the amplifying fiber (AF) which one is located on an opposite side to the delivery fiber (DF) to the Raman filter (RF, RF1 through RFn); g1 represents gain which the Raman scattered light receives per unit length in the light path; L2 represents a length of a light path from the Raman filter (RF, RF1 through RFn) to one of ends of the delivery fiber (DF) which one is located on an opposite side to the amplifying fiber (AF); g2 represents gain which the Raman scattered light receives per unit length in the light path; am represents a reflection attenuation by the Raman filter (RF, RF1 through RFn); at represents a transmission attenuation by the Raman filter (RF, RF1 through RFn); and ar represents a reflection attenuation by a workpiece which is processable by the fiber laser device (FL, FLS).

In one or more embodiments of the present invention, a method of setting, in a fiber laser device (FL, FLS), a reflection attenuation ar by a workpiece which is processable by the fiber laser device (FL, FLS), the fiber laser device (FL, FLS) including: an amplifying fiber (AF); and a delivery fiber (DF) in which laser light that has been outputted from the amplifying fiber (AF) is guided, the method including the step of setting the reflection attenuation ar so that the following inequality (a) is satisfied:

$$10^{\frac{2 \times g1 \times L1 - am}{10}} + 10^{\frac{2 \times g1 \times L1 + 2 \times g2 \times L2 - 2 \times at - ar}{10}} < 10^{\frac{2 \times g1 \times L1 + 2 \times g2 \times L2 - ar}{10}} \quad (a)$$

where: L1 represents a length of a light path from one of ends of the amplifying fiber (AF) which one is located on an opposite side to the delivery fiber (DF) to a Raman filter (RF, RF1 through RFn); g1 represents gain which Raman scattered light receives per unit length in the light path; L2 represents a length of a light path from the Raman filter (RF, RF1 through RFn) to one of ends of the delivery fiber (DF) which one is located on an opposite side to the amplifying fiber (AF); g2 represents gain which the Raman scattered light receives per unit length in the light path; am represents a reflection attenuation by the Raman filter (RF, RF1 through RFn); at represents a transmission attenuation by the Raman filter (RF, RF1 through RFn); and ar represents the reflection attenuation by the workpiece which is processable by the fiber laser device (FL, FLS).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

FL, FLS Fiber laser device
PS1 through PSm Excitation light source
PF1 through PFm Excitation fiber
PC Excitation combiner
FBG-HR High-reflection fiber Bragg grating
FBG-LR Low-reflection fiber Bragg grating
AF Amplifying fiber
DF Delivery fiber
H Irradiation head

The invention claimed is:
1. A fiber laser device comprising:
an amplifying fiber;
a delivery fiber in which laser light that has been outputted from the amplifying fiber is guided; and
a Raman filter that reflects part of Raman scattered light that is generated by stimulated Raman scattering caused to the laser light, wherein
the Raman filter satisfies inequality (a)

$$10^{\frac{2 \times g1 \times L1 - am}{10}} + 10^{\frac{2 \times g1 \times L1 + 2 \times g2 \times L2 - 2 \times at - ar}{10}} < 10^{\frac{2 \times g1 \times L1 + 2 \times g2 \times L2 - ar}{10}} \quad (a)$$

where:
L1 represents a length of a light path from a first end to the Raman filter, wherein the first end is one of ends of the amplifying fiber and is disposed on an opposite side to the delivery fiber;
g1 represents gain that the Raman scattered light receives per unit length in the light path;

L2 represents a length of a light path from the Raman filter to a second end that is one of ends of the delivery fiber and is disposed on an opposite side to the amplifying fiber;

g2 represents gain that the Raman scattered light receives per unit length in the light path;

am represents a reflection attenuation of the Raman filter;

at represents a transmission attenuation of the Raman filter; and ar represents a reflection attenuation of a workpiece that is processable-by the fiber laser device.

2. The fiber laser device according to claim 1, wherein the Raman filter further satisfies inequality (d)

$$2\int_{L1}^{L1+L2} g(P(z))dz - ar - am < 0 \quad (d)$$

where:

P(z) represents power of the laser light at a point at which a light path length from the first end to the delivery fiber, wherein the point is z; and g(P(z)) represents gain that the Raman scattered light receives per unit length at the point.

3. The fiber laser device according to claim 2, further comprising:

a fiber Bragg grating disposed to a third end that is one of ends of the amplifying fiber and is disposed on a delivery fiber side, wherein the P(z) is given by equality (f) with use of r'$_{oc}$ that is defined by equality (e)

$$r'_{oc} = 10 \times \log_{10}\left(10^{\frac{r_{oc}}{10}} + 10^{\frac{2t_{oc}+ar}{10}}\right) \quad (e)$$

$$P(z) = P \times \left(10^{\frac{r'_{oc}}{20 \times L0} \times (L0-z)} + 10^{\frac{r'_{oc}}{20 \times L0} \times (L0+z)}\right) \quad (f)$$

where:

L0 represents a length of the amplifying fiber;

r$_{oc}$ represents a reflection attenuation of the fiber Bragg grating;

t$_{oc}$ is a transmission attenuation of the fiber Bragg grating; and

P is power of the laser light outputted from the amplifying fiber via the fiber Bragg grating.

4. The fiber laser device according to claim 1, further comprising:

a plurality of amplifying fibers that comprises the amplifying fiber; and a combiner that combines the laser light that has been outputted from each of the plurality of amplifying fibers, wherein the delivery fiber comprises:

delivery fibers in each of which the laser light that has been outputted from a corresponding one of the plurality of amplifying fibers is guided to the combiner; and a delivery fiber in which the laser light that has been combined by the combiner is guided.

5. A method of producing a fiber laser device that comprises: an amplifying fiber; a delivery fiber in which laser light that has been outputted from the amplifying fiber is guided; and a Raman filter that reflects part of Raman scattered light that is generated by stimulated Raman scattering caused to the laser light, the method comprising:

providing the Raman filter that satisfies inequality (a)

$$10^{\frac{2 \times g1 \times L1 - am}{10}} + 10^{\frac{2 \times g1 \times L1 + 2 \times g2 \times L2 - 2 \times at - ar}{10}} < 10^{\frac{2 \times g1 \times L1 + 2 \times g2 \times L2 - ar}{10}} \quad (a)$$

where:

L1 represents a length of a light path from a first end to the Raman filter, wherein the first end is one of ends of the amplifying fiber and is disposed on an opposite side to the delivery fiber;

g1 represents gain that the Raman scattered light receives per unit length in the light path;

L2 represents a length of a light path from the Raman filter to a second end that is one of ends of the delivery fiber and is disposed on an opposite side to the amplifying fiber;

g2 represents gain that the Raman scattered light receives per unit length in the light path;

am represents a reflection attenuation of the Raman filter;

at represents a transmission attenuation of the Raman filter; and ar represents a reflection attenuation of a workpiece that is processable by the fiber laser device.

6. A method of setting, in a fiber laser device, a reflection attenuation ar of a workpiece that is processable by the fiber laser device, the fiber laser device comprising: an amplifying fiber; and a delivery fiber in which laser light is guided, wherein the laser light has been outputted from the amplifying fiber, the method comprising:

setting the reflection attenuation ar to satisfy inequality (a)

$$10^{\frac{2 \times g1 \times L1 - am}{10}} + 10^{\frac{2 \times g1 \times L1 + 2 \times g2 \times L2 - 2 \times at - ar}{10}} < 10^{\frac{2 \times g1 \times L1 + 2 \times g2 \times L2 - ar}{10}} \quad (a)$$

where:

L1 represents a length of a light path from a first end to the Raman filter, wherein the first end is one of ends of the amplifying fiber and is disposed on an opposite side to the delivery fiber;

g1 represents gain that Raman scattered light receives per unit length in the light path;

L2 represents a length of a light path from the Raman filter to a second end that is one of ends of the delivery fiber and is disposed on an opposite side to the amplifying fiber;

g2 represents gain that the Raman scattered light receives per unit length in the light path;

am represents a reflection attenuation of the Raman filter;

at represents a transmission attenuation of the Raman filter; and ar represents the reflection attenuation of the workpiece that is processable by the fiber laser device.

* * * * *